(12) United States Patent
Shah (10) Patent No.: US 9,321,355 B1
(45) Date of Patent: Apr. 26, 2016

(54) CONTROLLING ELECTRIC VEHICLE OPERATION BASED ON INCLINATION

(71) Applicant: Proterra Inc., Greenville, SC (US)

(72) Inventor: Keyur M. Shah, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/755,981

(22) Filed: Jun. 30, 2015

(51) Int. Cl.
*B60L 7/18* (2006.01)
*B60L 7/10* (2006.01)

(52) U.S. Cl.
CPC .... *B60L 7/18* (2013.01); *B60L 7/10* (2013.01)

(58) Field of Classification Search
CPC .................................... B60L 7/10; B60L 7/18
USPC ......................................................... 701/22
See application file for complete search history.

(56) References Cited

U.S. PATENT DOCUMENTS

| | | | |
|---|---|---|---|
| 8,453,773 B2 | 6/2013 | Hill et al. | |
| 2011/0166756 A1 | 7/2011 | Marcus | |
| 2011/0172868 A1 | 7/2011 | Marcus | |
| 2011/0178666 A1 | 7/2011 | Marcus | |
| 2011/0184615 A1 | 7/2011 | Marcus | |
| 2013/0311055 A1* | 11/2013 | Whitney | B60W 30/18027 701/54 |
| 2015/0051046 A1* | 2/2015 | Wise | B60K 6/387 477/15 |
| 2015/0051048 A1* | 2/2015 | Heap | B60W 20/1084 477/115 |
| 2015/0105948 A1* | 4/2015 | Chang | B60L 11/187 701/22 |
| 2015/0151760 A1* | 6/2015 | Kim | F16D 48/06 701/67 |
| 2015/0197250 A1* | 7/2015 | Heisel | B60W 30/18063 477/187 |

* cited by examiner

*Primary Examiner* — McDieunel Marc
*Assistant Examiner* — James E Stroud
(74) *Attorney, Agent, or Firm* — Bookoff McAndrews, PLLC (57) ABSTRACT

A method of operating an electric vehicle may include determining an angle of inclination of the electric vehicle, and selecting rates of regenerative braking corresponding to multiple brake pedal positions based on the determined angle of inclination.

20 Claims, 6 Drawing Sheets

CONTROLLING ELECTRIC VEHICLE OPERATION BASED ON INCLINATION

TECHNICAL FIELD

Embodiments of this disclosure relate to systems and methods of controlling the operation of an electric vehicle based on inclination of the vehicle.

BACKGROUND

An electric vehicle uses one or more electric motors for propulsion. In an electric vehicle, energy flows from the batteries to the wheels via the electric motor. During braking, the electric motor acts as a generator and energy flows from the wheels to the batteries via the motor. This is known as regenerative braking Regenerative braking is analogous to applying a negative torque on the motor. In some electric vehicles, when the accelerator pedal is released, the vehicle slows down by regenerative braking Pressing the brake pedal increases the rate of regenerative braking. Continued pressing of the brake pedal activates friction braking Typically, the rate of regenerative braking varies as a function of brake pedal position and is independent of the operating conditions (road grade, etc.) of the vehicle.

While such an approach may be adequate when a vehicle is travelling on level terrain, it may have limitations when the vehicle is travelling on an incline. Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to, among other things, systems and methods of controlling the operation of an electric vehicle based on inclination of the vehicle. Each of the embodiments disclosed herein may include one or more of the features described in connection with any of the other disclosed embodiments.

In one embodiment, a method of operating an electric vehicle is disclosed. The method may include determining an angle of inclination of the electric vehicle, and selecting rates of regenerative braking corresponding to multiple brake pedal positions based on the determined angle of inclination.

In another embodiment, a method of operating an electric vehicle having an inclinometer is disclosed. The method may include determining an angle of inclination of the electric vehicle from the inclinometer, and increasing a rate of regenerative braking corresponding to a brake pedal position with decreasing angles of inclination.

In yet another embodiment, an electric bus is disclosed. The bus may include an inclinometer configured to detect an inclination of the bus with respect to a horizontal plane, and a control system. The control system may be configured to select rates of regenerative braking corresponding to multiple brake pedal positions based on the determined angle of inclination.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods of controlling the operation of an electric vehicle based on inclination of the vehicle. While principles of the current disclosure are described with reference to an electric bus, it should be understood that the disclosure is not limited thereto. Rather, the systems and methods of the present disclosure may be used in any electric vehicle (electric cars, electric two-wheelers, etc.) or machine.

Figure 1:
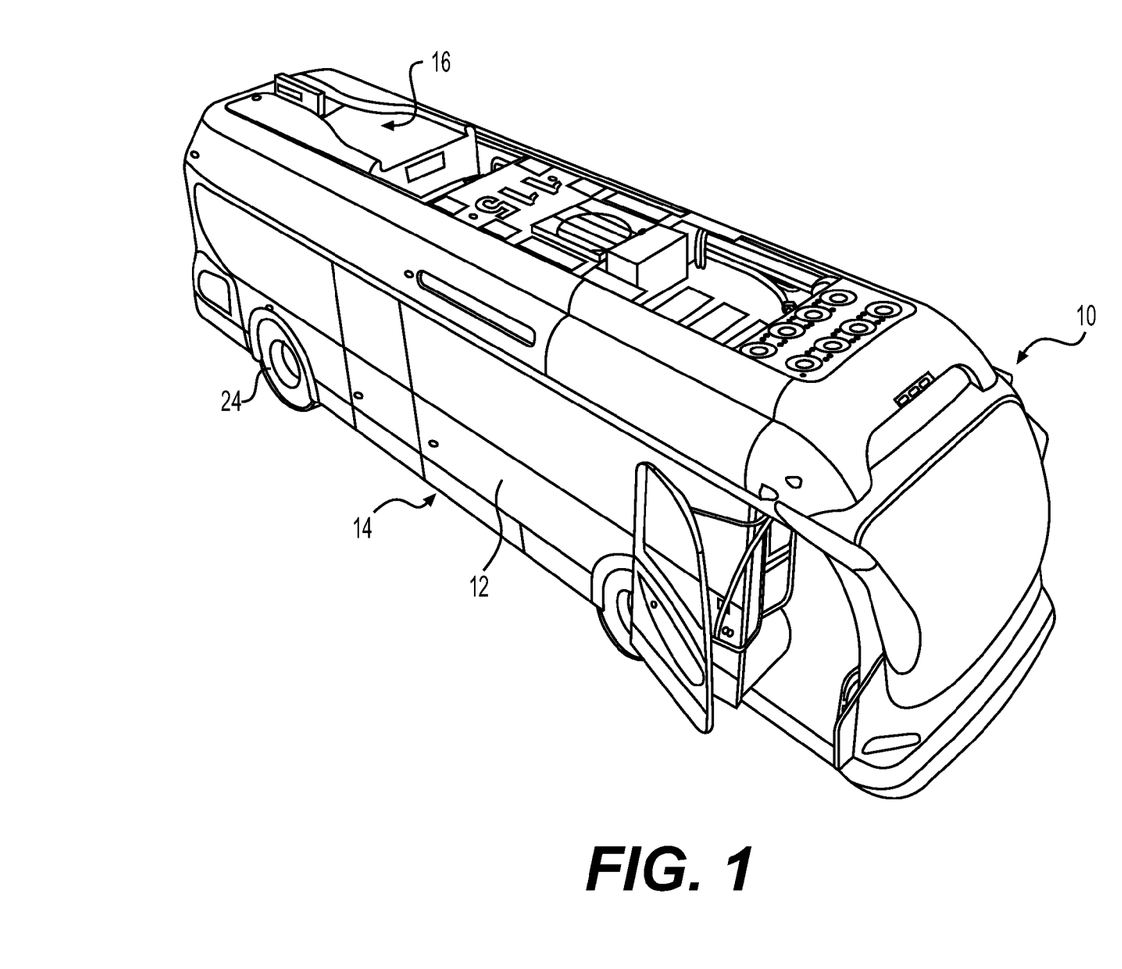
FIG. 1 is an illustration of an exemplary electric bus.

FIG. 1 illustrates an electric vehicle in the form of an electric bus 10. Electric bus 10 may include a body 12 enclosing a space for passengers. In some embodiments, some (or all) parts of body 12 may be fabricated using one or more composite materials to reduce its weight. Without limitation, body 12 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated value.

Figure 2:
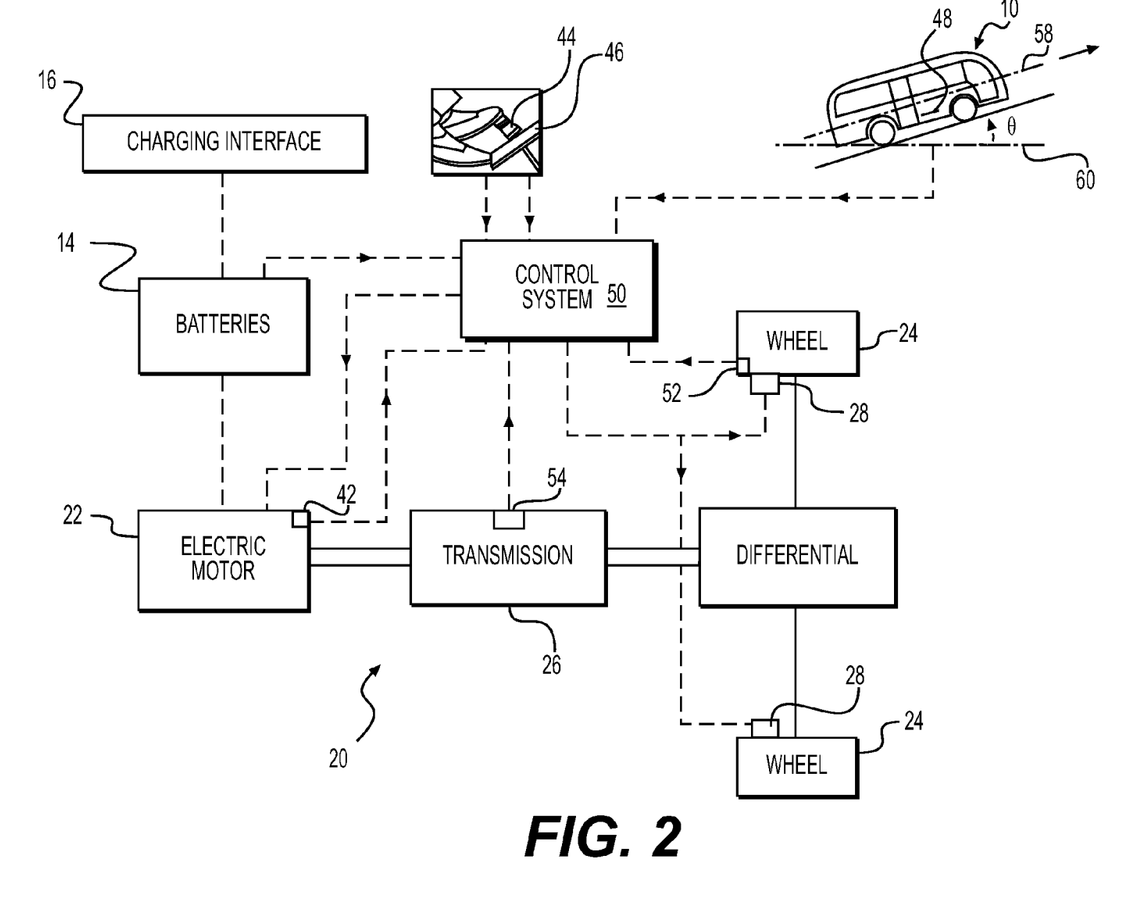
FIG. 2 is a schematic illustration of an exemplary control system that controls the operations of the bus of FIG. 1.

Bus 10 may include a powertrain that propels the drive wheels 24 of bus 10 along a road surface. As illustrated in FIG. 2, powertrain 20 may include an electric motor 22 that generates power, and a transmission 26 that transmits the power to drive wheels 24 of the bus 10. In the discussion below, reference will be made to both FIGS. 1 and 2. Batteries 14 may store electrical energy to power the electric motor 22. The batteries 14 may be stored anywhere on bus 10. In some embodiments, these batteries 14 may be positioned under the floor of the bus 10. The batteries 14 may have any chemistry and construction. In some embodiments, the batteries 14 may be lithium titanate batteries and may be configured for fast charging. During fast charging, the batteries 14 may be recharged to substantially its full capacity in a small amount of time (e.g., about ten minutes or less). Some possible battery chemistries and arrangements are described in commonly assigned U.S. Pat. No. 8,453,773 which is incorporated herein by reference in its entirety.

The batteries 14 may be charged (and recharged) by any means. In some embodiments, a charging interface 16 of bus 10 may couple with an external charging station (not shown) to charge the batteries. Although the charging interface 16 is shown as being positioned on the roof of the bus 10 in FIG. 1, in general, the charging interface 16 may be positioned anywhere on the bus 10. Alternatively or additionally, batteries 14 may be charged using an on-board charging device (e.g., IC engine, fuel cell, etc.).

The electric motor 22 operates using power from the batteries 14 to produce torque that propels the bus 10. In general, the torque output of the electric motor 22 is proportional to the characteristics of the current directed to the electric motor 22. A control system 50 controls the torque output of the motor 22 by varying the characteristics of current directed to the motor (called torque command). The transmission 26 may include a plurality of gears (not shown) configured to switch between different gear ratios to convert the rotation speed (and torque) of the motor 22 to several different speeds (and torques) of the drive wheels 24. Transmission 26 may also include a plurality of clutches (not shown) adapted to selectively couple several of the gears together to change the gear ratio between its input shaft and the output shaft based on the gear selected by the driver (drive or "D," reverse or "R," park or "P," etc.).

Bus 10 also includes a braking system to stop or slow the bus 10. Any type of braking system may be used on the bus 10. During operation of bus 10, when the driver activates (e.g., presses down on) an accelerator pedal, energy flows from the batteries 14 to the motor 22. The torque produced by the motor 22 is used to rotate the drive wheels 24. When the driver releases the accelerator pedal or activates (i.e. presses on) the brake pedal, the whole process goes into reverse. Based on the accelerator and brake pedal positions, the control system 50 applies a torque command to the motor 22 to produce the requested torque. The torque command can be positive or negative. When the torque command is positive, the motor 22 propels the bus 10, and when the torque command is negative, the motor 22 operates as a generator and produces energy. The energy produced by the motor 22 (acting as a generator) is used to recharge the batteries 14. This process slows the bus 10, and is known as regenerative braking. When the driver activates or pushes the brake pedal past a point, pneumatic components (not shown) of the braking system push the brake pads 28 against the wheels 24 to slow the bus 10 by friction braking Since operation of the braking system of a bus 10 is known in the art, it is not discussed extensively herein.

Braking system may also include an interlock braking mechanism which automatically (without any action by the driver) actuates the brake pads 28 based on operating conditions of the bus 10. For example, to prevent the bus 10 from being moved when passengers are entering and exiting, the control system 50 may use the interlock braking mechanism to activate the brake pads 28 when it detects an open door. When the door is closed, the brake pads 28 are released, and the bus 10 is permitted to move again. The interlock braking mechanism may also act to stop a bus 10 undergoing rollback. When a bus starts from an incline (e.g., from a stop sign or a traffic light), as the driver releases the brakes to resume movement, the bus 10 may momentarily roll in a direction opposite to the direction of intended movement due to gravity. This unintended movement of the bus is called rollback. When the control system 50 detects that a rollback is occurring (described in more detail later), the interlock braking mechanism may be activated to actuate the brake pads 28 and stop the bus (called a hill-stop function).

Bus 10 may include a plurality of sensors to detect its operating parameters during operation. These sensors may include, among others (e.g., SOC sensor, etc.), a rotation sensor 42, a brake pedal sensor 44, an accelerator pedal sensor 46, an inclinometer 48, a speed sensor 52, and a gear sensor 54. Rotation sensor 42 may be any type of sensor (e.g., optical encoder, etc.) adapted to detect rotation of motor 22. When the motor 22 rotates, sensor 42 may detect the direction and amount of its rotation. The speed sensor 52 may be a sensor that detects the direction and magnitude of the speed of bus 10. The rotation sensor 42 and speed sensor 52 may both detect movement (rollback, etc.) of the bus 10 in the forward and the reverse directions. The SOC sensor (not shown) may detect the state of charge (SOC) of the batteries 14. While rotation sensor 42 is illustrated as being coupled to motor 22, and the speed sensor 52 is illustrated as being coupled to wheel 24, this is only exemplary. These sensors may be coupled to bus 10 at any location. For instance, the speed sensor 52 may be coupled to an output shaft from transmission 26 and the rotation sensor 42 may be coupled to an output shaft of motor 22. In some embodiments, one of the rotation sensor 42 or the speed sensor 52 may be eliminated.

Brake pedal sensor 44 and accelerator pedal sensor 46 may be sensors that detect the position of the brake and accelerator pedals, respectively. Any type of sensor may be used as brake pedal and accelerator pedal sensors 44, 46. And, these sensors may be positioned at any location. In some embodiments, these sensors may be connected to the brake and accelerator pedals respectively. As the driver steps on (or otherwise activates) the accelerator and/or the brake pedals, the corresponding sensor senses the movement of the pedal and detects its position. The gear sensor 54 may detect the gear (P, D, R) that the bus 10 is currently on.

Inclinometer 48 may detect the angle of inclination $\theta$ of the bus 10 with respect to a horizontal plane 60. The horizontal plane 60 is a plane perpendicular to the direction of gravitational force. Angle of inclination $\theta$ is the angle between an axis 58 along the length of the bus 10 and the horizontal plane 60, in the direction (or intended direction) of bus travel (as indicated by an arrow in front of bus 10 in FIG. 2). That is, a bus 10 travelling in the forward direction up an incline (i.e., driving up the incline) may have an angle of inclination of $\theta$. The bus driving down the same incline may have an angle of inclination of $-\theta$. Any type of sensor (tilt sensor, grade sensor, accelerometer, etc.) that detects the inclination of the bus 10 may be used as inclinometer 48. As the bus 10 travels on (up or down) an inclined road surface, the inclinometer 48 may detect the magnitude and direction of the incline with respect to the horizontal plane 60. The inclinometer 48 may be positioned at any location on bus 10.

Alternatively or additionally, the angle of inclination $\theta$ of the bus 10 may be transmitted to the bus 10 from an external source. For example, a database at a remote site (charging station, control station, etc.) may include the angles of inclination of the road surfaces that the bus 10 is expected to travel on (e.g., from GPS data, data created from a survey, etc.). Periodically, or on demand from the bus 10, the angle of inclination $\theta$ of the road surface that the bus is currently travelling on may be transmitted to the bus 10 from the remote site.

The signals from the sensors (42, 44, 46, 48, 52, and 54) may be directed to the control system 50. Control system 50 may be part of a device that controls several operations (for example, HVAC control, door opening/closing, kneeling, etc.) of the bus 10. As is known in the art, control system 50 may include a collection of mechanical, electrical, and electronic devices (for example, computational units, A/D converters, memory, switch, valves, actuators, fuses, etc.) that collectively perform the functions of control system 50. Although control system 50 is illustrated as a single system, in some embodiments, the functions of control system 50 may be divided across multiple controllers (body controller, powertrain controller, traction motor controller, etc.) of the bus 10.

Based on the detected (sensed, communicated from a remote site, etc.) angle of inclination θ, and other operating parameters, the control system 50 may control the operation of the bus 10 to increase its efficiency. As discussed previously, when the driver releases the accelerator pedal, regenerative braking acts to slow the bus 10. Regenerative braking may continue until the brake pedal is actuated (or pressed) past a preselected point (e.g., 60% brake pedal position, 80% brake pedal position, etc.). Pressing the brake pedal past this point, may activate friction braking. The bus 10 may be further slowed and brought to a halt by friction braking. The preselected point at which friction braking is activated, and the rate of regenerative braking corresponding to different brake pedal positions (i.e., when the brake pedal is pressed by 0%, 10%, 50%, etc. of its range of motion) may be selected by control system 50. In some embodiments, these values may be preprogrammed into the control system 50. For instance, a brake pedal position of 0% (i.e., brake pedal is not activated or pressed) after release of the accelerator pedal may correspond to applying a first amount of negative torque (e.g., −100 Nm) on motor 22 (or a first rate of regenerative braking), and a brake pedal of position of 80% may correspond to applying a second amount of negative torque (e.g., −300 Nm) on motor 22 (or a second rate of regenerative braking).

In some embodiments, the control system 50 may select the brake pedal position at which friction braking is activated, and the amount/rate of regenerative braking corresponding to different brake pedal positions based on the detected operating parameters of bus 10. For example, when the bus 10 is traveling down a hill, releasing the accelerator pedal may cause more regenerative braking (i.e. increased rate of regenerative braking to cause the bus 10 to slow down more) than when the bus is traveling up a hill. Adjusting the rate of regenerative braking based on the angle of inclination of the bus 10 may allow the bus 10 to slow down smoothly in all operating conditions. For example, increasing the rate of regenerative braking as the bus 10 is driving down an incline, allows the bus to counteract gravitation force and slow faster. And, decreasing the rate of regenerative braking when the bus is driving up an incline allows counteracts gravitational force which tends to slow the bus down further. In some embodiments, the amount of regenerative braking allowed may also be based on the SOC of the batteries 14. For example, if the batteries are full then the amount of regenerative braking available will be less. In such embodiments, the control system 50 may optimize the amount of regenerative braking available based on the battery chemistry and the SOC of the batteries 14.

Figure 3A:
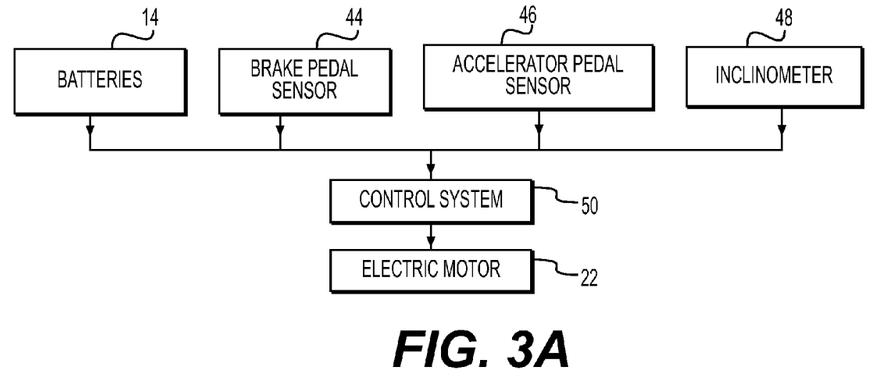
FIG. 3A is a schematic illustration of an exemplary control system that controls regenerative braking of the bus based on its inclination.

FIG. 3A illustrates an exemplary embodiment of control system 50 which controls the rate of regenerative braking based on the operating parameters of the bus 10. As illustrated in FIG. 3A, based on signals from the inclinometer 48, brake pedal sensor 44, and the accelerator pedal sensor 46, and the batteries 14 (e.g., SOC sensor, battery management system, etc.) the control system 50 may control regenerative braking That is, the control system 50 may select the rate of regenerative braking (or the amount of negative torque applied to motor 22) based on these sensor inputs.

Figure 3B:
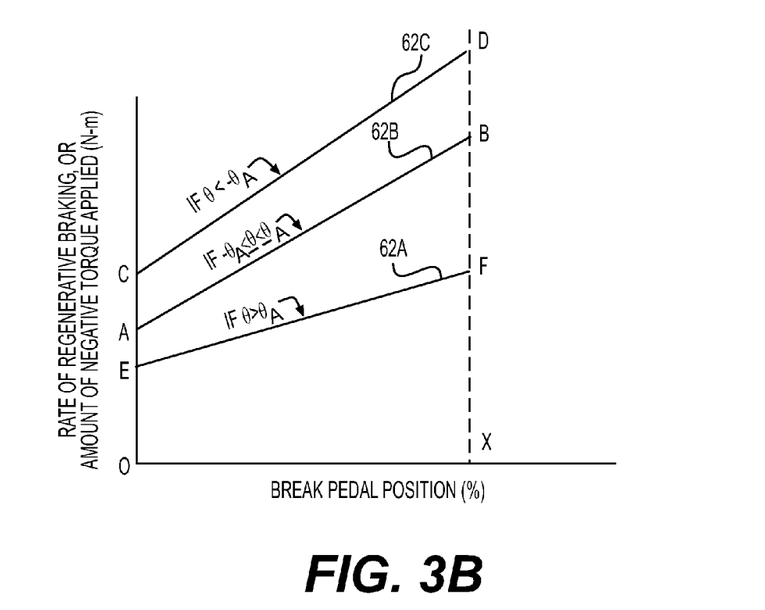
FIG. 3B is an exemplary graph used by the control system of FIG. 3A to control regenerative braking.

FIG. 3B is an exemplary graph of the rate of regenerative braking versus brake pedal position for different angles of inclination θ at 45% SOC with LTO battery technology. Since the rate of regenerative braking is proportional to the amount of negative torque applied on the motor 22, the Y-axis of this graph also corresponds to the amount of negative torque applied to the motor 22. For convenience, the y-axis values of this graph are referred in this disclosure as the rates of regenerative braking. However, it should be noted that, these values can also be referred as the amounts of negative torque applied to the motor 22. Curves 62A, 62B, and 62C indicate the rate of regenerative braking versus brake pedal position when the detected angles of inclination (θ) are greater than $\theta_A$ ($\theta > \theta_A$), between $-\theta_A$ and $\theta_A$ ($-\theta_A \leq \theta \leq \theta_A$), and less that $-\theta_A$ ($\theta < -\theta_A$), respectively. FIG. 3B may be a map or a table of values stored in a memory of the control system 50. It is also contemplated that curves 62A, 62B, and 62C may be calculated based on one or more algorithms programmed in the control system 50. A user may change these values (or algorithms) by reprogramming.

Figure 3C:
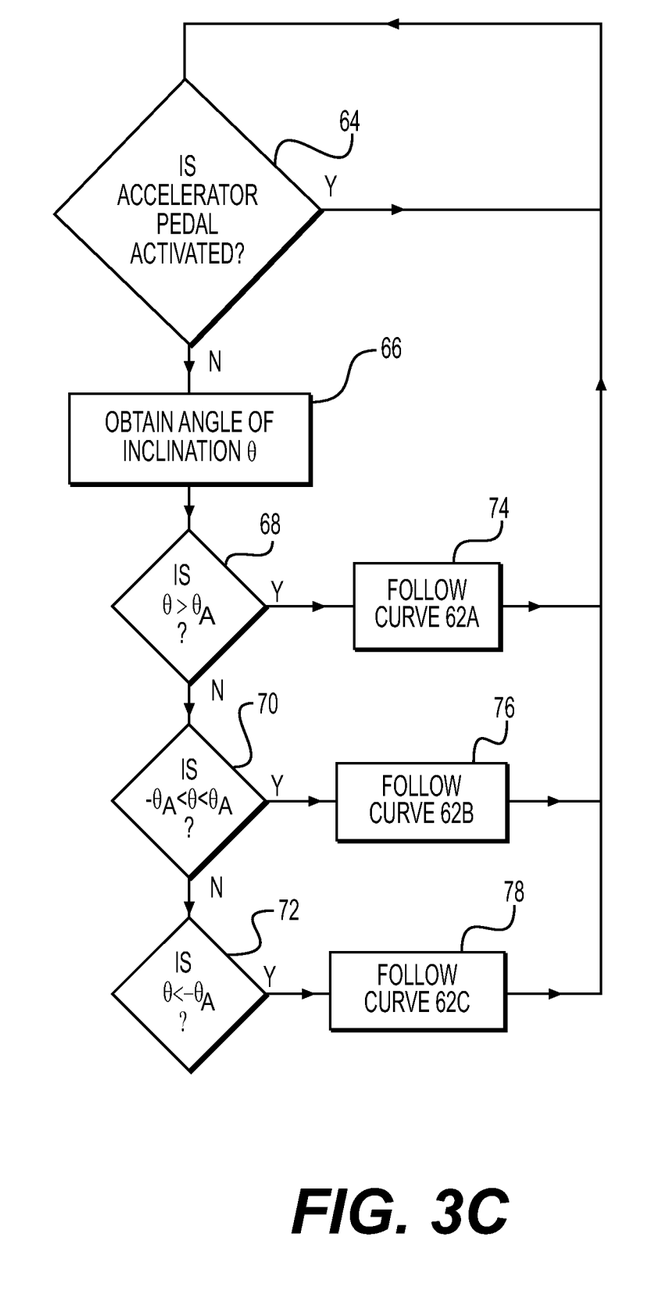
FIG. 3C is an exemplary method of operating the bus of FIG. 1 using the control system of FIG. 3A.

FIG. 3C illustrates an exemplary method used by control system 50 to control regenerative braking. In the discussion that follows, reference will be made to FIGS. 3A-3C. When the accelerator pedal is not pressed (i.e., when accelerator pedal sensor 46 indicates that the accelerator pedal is not pressed) (step 64), the control system 50 may obtain the angle of inclination θ of the bus 10 (from inclinometer 48, from remote site, etc.) (step 66). When the angle of inclination θ is greater that a first value $\theta_A$ (i.e., when the bus is driving up an incline) (step 68), the control system 50 may follow curve 62A of FIG. 3B to set the rate of regenerative braking for different brake pedal positions (step 74). When $\theta > \theta_A$, the rate of regenerative braking at a brake pedal position of 0% (i.e., when the brake pedal is not pressed) is set at a value E and the rate of regenerative braking at a brake pedal position of X % (i.e., when the brake pedal is depressed by X % of its maximum range) is set at a value F which is greater than value E. Further pressing of the brake pedal (beyond X %) may activate friction braking.

When the angle of inclination θ obtained in step 66 is less than or equal to (≤) $\theta_A$, but greater than or equal to (≥) $-\theta_A$ (i.e., $-\theta_A \leq \theta \leq \theta_A$), the control system 50 may follow curve 62B of FIG. 3B to set the rate of regenerative braking for different brake pedal positions. In this step (step 76), the rate of regenerative braking at a brake pedal position of 0% is set at a value A which is greater than value E, and the rate of regenerative braking at a brake pedal position of X % is set at a value B greater than value A. That is, when the inclination of the bus 10 is within a small angular range $-\theta_A$ to $\theta_A$ about the horizontal plane 60 (e.g., when the bus is travelling on a substantially level surface), the control system 50 may increase the rate of regenerative braking of the bus 10 as compared to when it was travelling up an incline. Increasing the rate of regenerative braking will slow the bus 10 down faster upon release of the accelerator pedal (or when brake pedal is pressed).

When the angle of inclination θ obtained in step 66 is less than $-\theta_A$ (i.e., the bus is driving down an incline), the control system 50 may follow curve 62C of FIG. 3B to set the rate of regenerative braking for different brake pedal positions (step 78). In this step, the rate of regenerative braking at a brake pedal position of 0% is set at a value C greater than value A, and the rate of regenerative braking at a brake pedal position of X % is set at a value D greater than value C. That is, when the bus is travelling down an incline (i.e., $\theta < -\theta_A$), the control system 50 may further increase the rate of regenerative braking of the bus 10 (as compared to when it was travelling on a substantially level surface) to increase the slowing of the bus by regenerative braking upon release of the accelerator pedal.

The value of X (the brake pedal position beyond which friction braking is activated) may be selected based on the application and may be programmed into the control system 50. In general, X may have any value between 30% and 100%. In some embodiments, X may be 80%. Although the brake pedal position beyond which friction braking is activated is considered to be a constant (i.e., X %) for each of curves 62A, 62B, and 62C, this is not a limitation. In some embodiments, the brake pedal position beyond which friction braking is activated (or the brake pedal position corresponding to the maximum rate of regenerative braking) may depend upon the angle of inclination θ of the bus. In some embodiments, the brake pedal positions beyond which friction braking is activated for cases 62A, 62B, and 62C may be P %, Q %, and R % respectively. In general, P, Q, and R may have any values.

Although the braking mechanism of the bus 10 is described as transitioning from regenerative braking to friction braking at a brake pedal position of X %, this is not a limitation. In some embodiments, both regenerative and friction braking may act together at all brake pedal positions. In some embodiments, regenerative braking and friction braking may coexist at some ranges of brake pedal positions, while one of these mechanisms may act individually in other ranges. For example, regenerative braking may be operative from a brake pedal position of 0% to 80%, and friction braking may be operative from a brake pedal position of 50% to 100%. Within the brake pedal position range of 50-80%, both regenerative and friction braking may operate.

In an exemplary embodiment, when the angle of inclination greater than about 10% (i.e., $θ_A$>10%) (i.e, bus is traveling up an incline), the rate of regenerative braking at 0% brake pedal position may correspond to a torque of about −100 Nm, and when the angle of inclination is between about 10% and −10% (bus is traveling on a substantially level road), the rate of regenerative braking (at 0% brake pedal position) may be increased to about −150 Nm. And, at angles of inclination less that about −10% (bus is traveling down an incline), the rate of regenerative braking at 0% brake pedal position may be −200 Nm.

Although the rate of regenerative braking is illustrated as varying linearly between its minimum and maximum values in each of curves 62A, 62B, and 62C, this is not a limitation. In general, the rate of regenerative braking may vary from a lower value at a brake pedal position of 0% to a higher value at a brake pedal position of X % in any manner (e.g., non-linear, piecewise linear, curved, step, etc.). Further, although control system 50 is described as using curve 62A when $θ>θ_A$, and curve 62C when $θ<-θ_A$, this is not a limitation. In some embodiments, control system 50 may follow curve 62A when $θ>θ_A$, curve 62C when $θ<-θ_B$, and curve 62B when $-θ_B≤θ≤θ_A$ (where $θ_A$ is not equal to $θ_B$).

As illustrated in FIG. 3B, for the same brake pedal position, control system 50 increases the rate of regenerative braking with decreasing angle of inclination. Therefore, the bus 10 slows down faster when the accelerator pedal is released (or when the brake pedal is pressed) while driving down an incline than when it is driving up an incline. Decreasing the rate of regenerative braking when the bus is driving up an incline allows the momentum (i.e., kinetic energy) of the bus to be used to propel the bus over the incline. Using the momentum to travel up the incline decreases energy consumption from the batteries 14 and thus increases efficiency. Increasing the rate of regenerative braking as the bus 10 is driving down an incline, allows the driver to overcome the momentum of the bus and slow it down faster before resorting to friction braking Slowing the bus by friction braking is inefficient since the kinetic energy of the bus is wasted (as, for example, heat). Conversely, slowing the bus using regenerative braking increases efficiency since kinetic energy of the bus is used to charge the batteries 14.

In some embodiments, control system 50 may further control the operation of the bus 10 based on the detected angle of inclination θ. As explained previously, when a bus starts from an incline, it may experience rollback. While the hill-hold function of the bus 10 may eventually stop rollback, there may be a substantial time lag between the time when rollback begins and the interlock braking mechanism finally stops the bus (e.g., due to lag in the pneumatic components of the braking system). When the angle of inclination θ of the bus 10 is high, this time lag may cause the bus 10 to move a substantial distance before the bus is stopped (called rollback distance). In some embodiments, the control system 50 may also act to reduce the rollback distance.

Figure 4A:
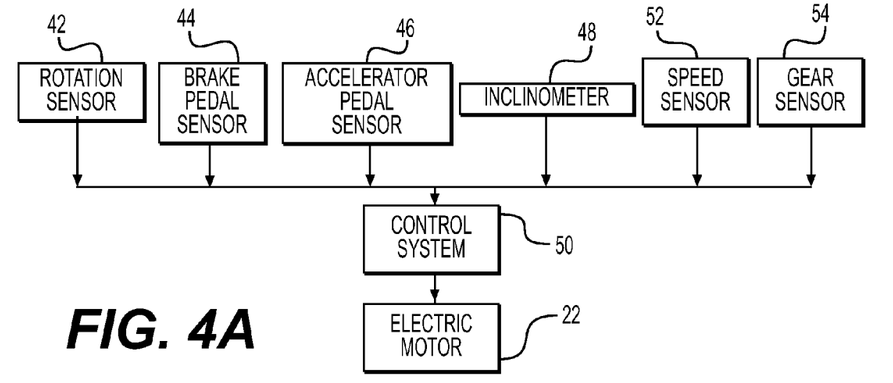
FIG. 4A is a schematic illustration of an exemplary control system that controls creep torque of the bus based on its inclination.

To reduce rollback distance, control system 50 may activate the motor 22 to produce a creep torque to stop the bus when rollback is detected. The creep torque may generate enough force to resist the gravitational forces which cause rollback. In some embodiments, the control system 50 determines the magnitude of the creep torque based on the angle of inclination θ of the bus 10. FIG. 4A illustrates an embodiment of control system 50 that controls electric motor 22 to produce creep torque to reduce rollback. The control system 50 may control the electric motor 22 to produce creep torque based on signals from the inclinometer 48 and one or more of rotation sensor 42, brake pedal sensor 44, accelerator pedal sensor 46, speed sensor 52, and gear sensor 54.

Figure 4B:
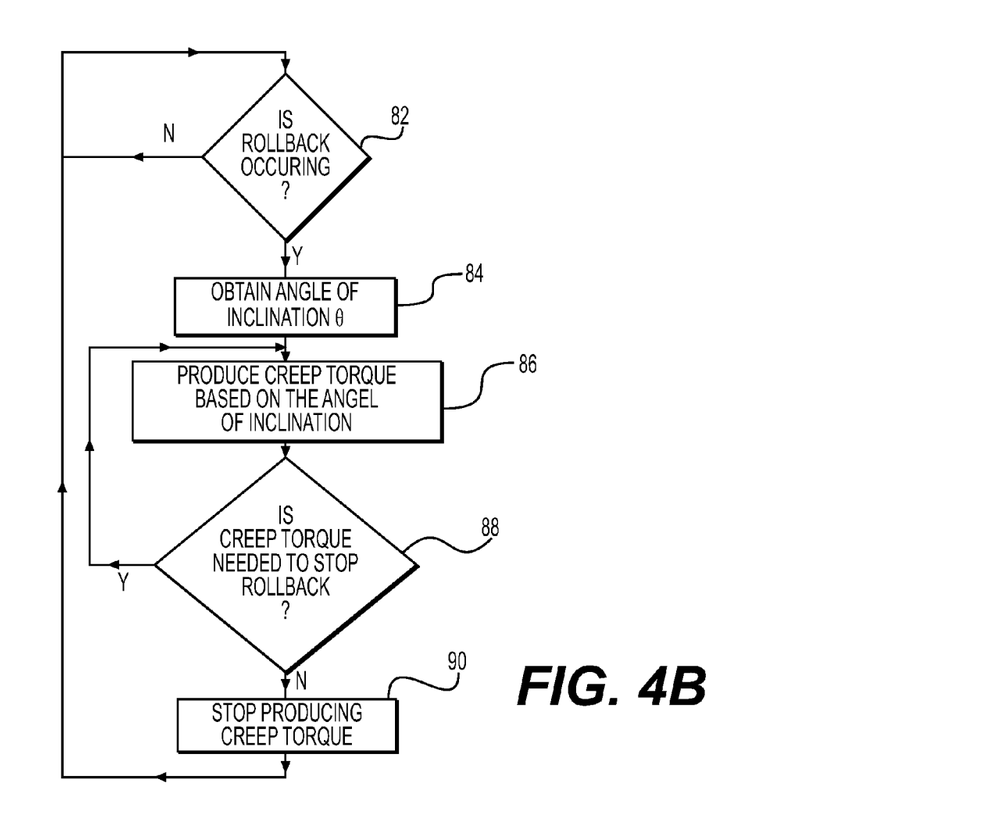
FIG. 4B is an exemplary method of operating the bus of FIG. 1 using the control system of FIG. 4A.

FIG. 4B illustrates an exemplary method used by control system 50 to reduce rollback. When rollback of the bus 10 is detected (step 82), the angle of inclination θ of the bus 10 (from inclinometer 48, remote site, etc.) is noted (step 84). Control system 50 may detect the occurrence of rollback based on one or more of the rotation sensor 42, speed sensor 52, and the gear sensor 54. For instance, the control system 50 may conclude that rollback is occurring when the rotation sensor 42 and/or the speed sensor 52 indicates that the motor 22 is rotating in a direction opposite to the expected direction of rotation based on the gear (R, P, D, etc.) that the bus 10 is currently on (as indicated by the gear sensor 54). Although not discussed herein, control system 50 may also detect rollback using other methods.

When rollback occurs, the control system 50 may control the electric motor 22 to produce creep torque based on the obtained angle of inclination (step 86). In some embodiments, the control system 50 may determine the required magnitude of creep torque based on algorithms or values programmed therein. For example, as will be described below, control system 50 may include a map (curve, table of values, etc.) of creep torque values for different angles of inclination θ. Using this map, the control system 50 may issue a torque command to the motor to produce the corresponding amount of creep torque. In some embodiments, control system 50 may check to see if the applied creep torque is sufficient (e.g., if rollback is still occurring) based on feedback from the rotation sensor 42 and/or the speed sensor 52. Based on this feedback, the control system 50 may incrementally adjust the applied creep torque to stop rollback. After a sufficient amount of creep torque is applied, control system 50 may check to see if creep torque is still needed to stop rollback (step 88). That is, the control system 50 may determine if a change in operating parameters (e.g., if the interlock braking mechanism has actuated the brake pads 28, if the driver has applies the brakes, if the driver has requested sufficient torque to move the bus in the intended direction, etc.) has eliminated the need for creep torque. When such a change is detected, the control system 50 may instruct the motor to stop producing creep torque (step 90).

Figure 4C:
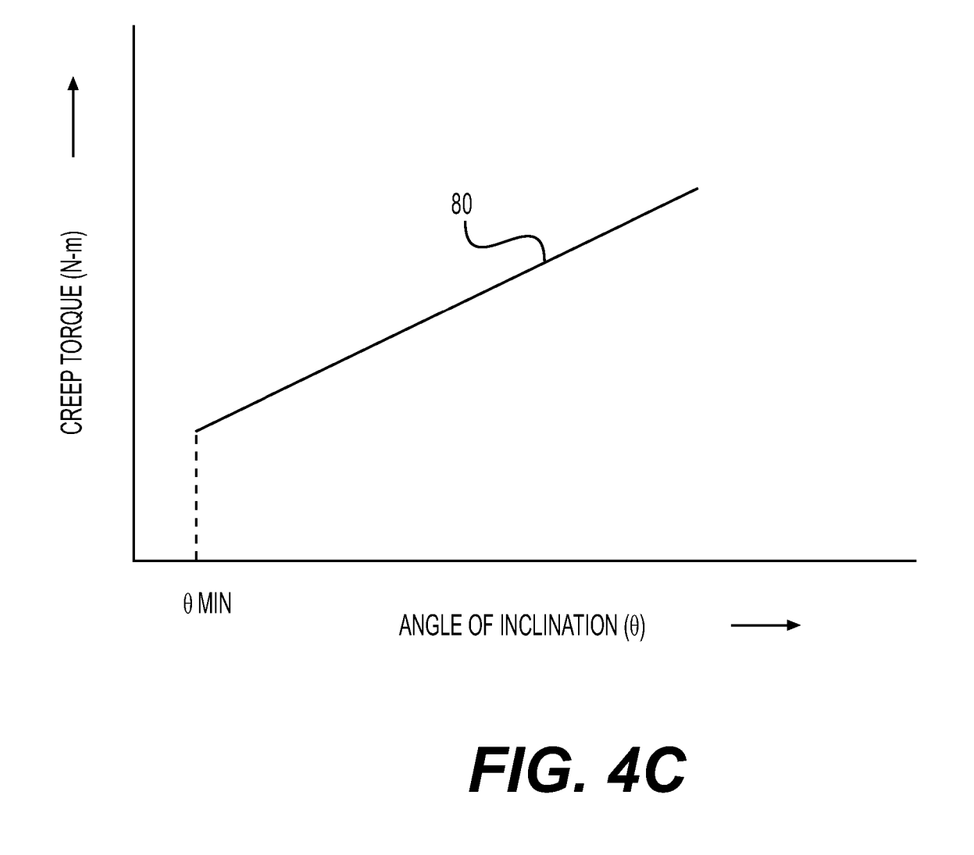
FIG. 4C is an exemplary graph used by the control system of FIG. 4A to control creep torque.

As discussed above, in step 86, the control system 50 may produce creep torque based on the angle of inclination θ. FIG. 4C illustrates a graph of creep torque versus angle of inclination θ. Control system 50 may follow curve 80 to produce creep torque based on the angle of inclination. For example, when a bus 10 is trying to go up an incline (having an angle of inclination θ) experiences rollback, the control system 50 may select a value of creep torque corresponding to an angle θ from curve 80, and control the motor 22 to produce this value of creep torque. The creep torque may result in a force opposite to the direction of rollback and thus stop or reduce rollback. The creep torque may be discontinued when the hill-hold function of the bus acts to stop rollback or when the driver takes an action (apply brakes, accelerates, etc.) to stop the rollback. In some embodiments, control system 50 may only apply creep torque if the angle of inclination exceeds a minimum value. For example, prior experience may indicate that bus 10 does not experience rollback on inclines less than a minimum value $θ_{min}$ (e.g., 5°). This value of $θ_{min}$ may be a preprogrammed into the control system 50.

Although the graph of FIG. 4C shows only one curve 80, in some embodiments, the graph may include multiple curves for different operating conditions (e.g., bus weight, number of passengers, etc.). Further, although curve 80 is indicated as a linear curve, this is not a requirement. In general, curve 80 may be any type of curve (non-linear, piecewise linear, curved, etc.). Curve 80 may be a map or a table of values stored in a memory of the control system 50 or may be calculated based on an algorithm programmed in control system 50. A user may change these values (or algorithms) by reprogramming.

In some embodiments, curve 80 may be determined based on experimentation. For instance, experiments may be conducted to determine the requisite amount of creep torque to stop rollback for different angles of inclination θ and different operating conditions. These experimentally determined values (or one or more algorithms describing their relation) may be programmed into the control system 50. In some embodiments, in place of using multiple curves to determine the required creep torque for different operating conditions, the control system 50 may control the motor 22 using feedback from the sensors. For instance, when rollback is detected, control system 50 may control the motor 22 to produce an amount of creep torque corresponding to the angle of inclination θ of the bus (e.g., based on curve 80). The control system 50 may then use feedback from the sensors (e.g., rotation sensor 42 and/or speed sensor 52) to determine if the bus 10 has stopped. If it has not, the control system 50 may incrementally increase the amount of creep torque produced by the motor 22 until the sensors indicate that the bus has stopped.

Preventing or reducing rollback on inclined road surfaces by selectively applying creep torque improves safety and may prevent accidents. Since the control system 50 determines the appropriate amount of creep torque to be applied based on the angle of inclination of the bus, the improved safety is achieved without a significant increase in energy consumption.

While principles of the present disclosure are described herein with reference to an electric bus, it should be understood that the disclosure is not limited thereto. Rather, the systems and methods described herein may be employed on any electric vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of operating an electric vehicle, comprising:
   determining an angle of inclination of the electric vehicle;
   selecting a first rate of regenerative braking for a first brake pedal position when the angle of inclination is a first angle; and
   a second rate of regenerative braking for the first brake pedal position when the angle of inclination is a second angle, wherein a rate of regenerative braking is indicative of an amount of braking force applied to the vehicle.

2. The method of claim 1, wherein the first brake pedal position corresponds to a brake pedal position of 0%.

3. The method of claim 1, wherein the first rate of regenerative braking is higher than the second rate of regenerative braking when the second angle is higher than the first angle.

4. The method of claim 1, further including selecting a third rate of regenerative braking corresponding to a second brake pedal position when the angle of inclination is the first angle, wherein the third rate of regenerative braking is higher than the first rate of regenerative braking.

5. The method of claim 1, further including selecting, for the same brake pedal position, higher values for the rate of regenerative braking with decreasing angle of inclination.

6. The method of claim 1, wherein determining an angle of inclination includes determining an angle of inclination from an inclinometer of the vehicle.

7. The method of claim 1, further including determining if rollback of the vehicle is occurring.

8. The method of claim 7, further including generating creep torque to counteract the rollback if rollback is occurring.

9. The method of claim 8, wherein a magnitude of the generated creep torque is determined based on the determined angle of inclination.

10. The method of claim 1, wherein the electric vehicle is an electric bus.

11. A method of operating an electric vehicle having an inclinometer, comprising:
    determining an angle of inclination of the electric vehicle from the inclinometer; and
    increasing a rate of regenerative braking corresponding to a same brake pedal position with decreasing angles of inclination, wherein a rate of regenerative braking is indicative of an amount of braking force applied to the vehicle.

12. The method of claim 11, wherein increasing the rate of regenerative braking includes increasing the rate of regenerative braking at a brake pedal position of 0% with decreasing angles of inclination.

13. The method of claim 11, further including determining if rollback of the vehicle is occurring.

14. The method of claim 13, further including generating creep torque to counteract the rollback if rollback is occurring.

15. The method of claim 14, wherein a magnitude of the generated creep torque is determined based on the determined angle of inclination.

16. The method of claim 11, wherein the electric vehicle is an electric bus.

17. An electric bus, comprising:
    an inclinometer configured to detect an inclination of the bus with respect to a horizontal plane; and
    a control system configured to (a) select a first rate of regenerative braking for a first brake pedal position when the angle of inclination is a first angle and (b) a second rate of regenerative braking for the first brake pedal position when the angle of inclination is a second angle, wherein a rate of regenerative braking is indicative of an amount of braking force applied to the vehicle.

18. The bus of claim 17, wherein the first brake pedal position corresponds to a brake pedal position of 0%.

19. The bus of claim 17, wherein the first rate of regenerative braking is higher than the second rate of regenerative braking when the second angle is higher than the first angle.

20. The bus of claim 17, wherein the control system is further configured to:
   determine if rollback of the bus is occurring, and if occurring, generate creep torque to counteract the rollback, wherein a magnitude of the generated creep torque is determined based on the determined angle of inclination.

* * * * *